March 7, 1961  R. L. BROWN ET AL  2,973,895
MOTOR MOUNTINGS
Filed June 3, 1959  2 Sheets-Sheet 1
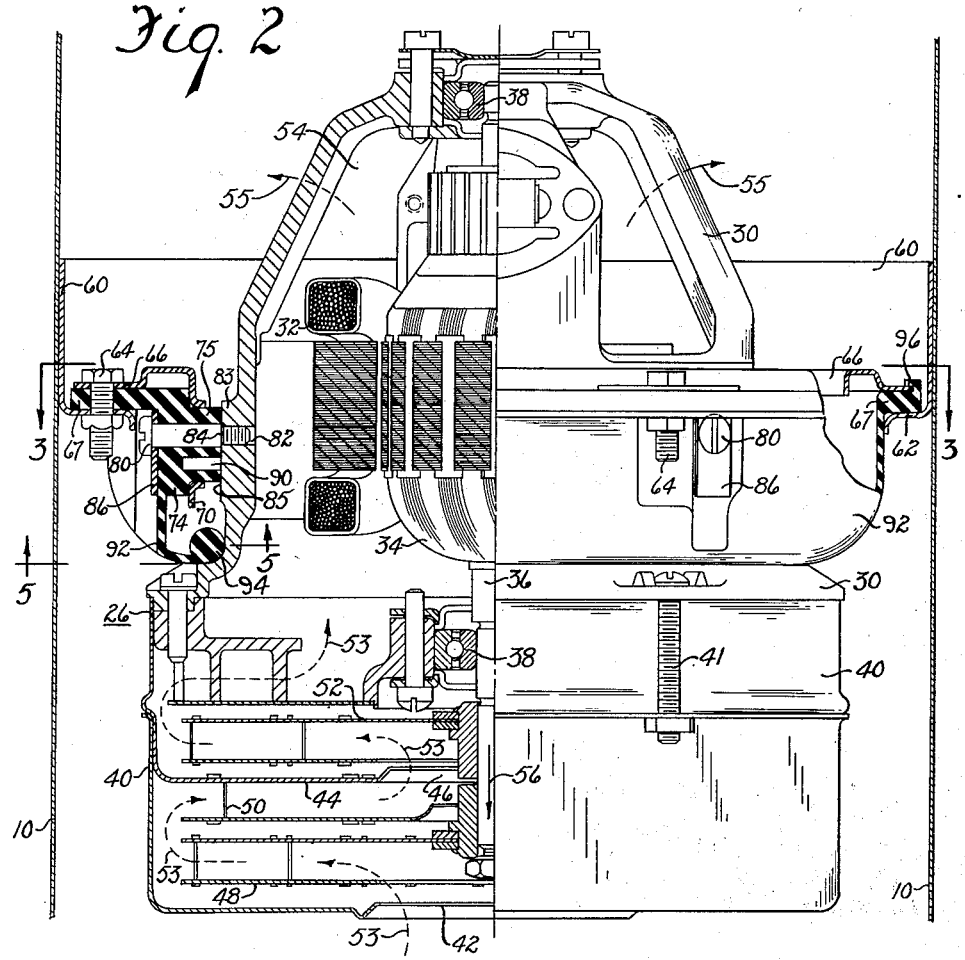
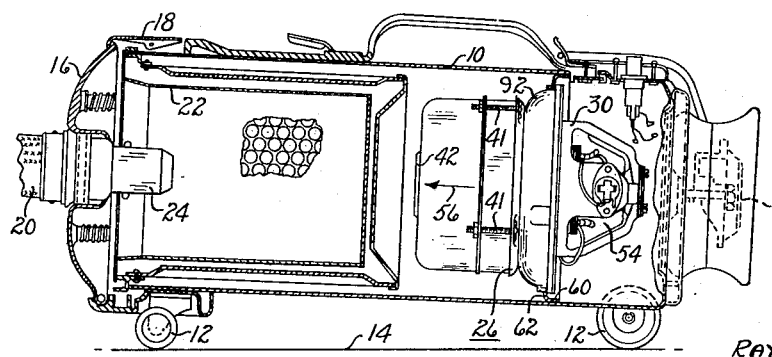
INVENTORS
RAYMOND L. BROWN
GARRET MOTT, JR.
LAWRENCE J. SMERIGLIO
BY
Thomas C. Betts
THEIR ATTORNEY March 7, 1961 R. L. BROWN ET AL 2,973,895
MOTOR MOUNTINGS
Filed June 3, 1959 2 Sheets-Sheet 2

INVENTORS
RAYMOND L. BROWN
GARRET MOTT, JR.
LAWRENCE J. SMERIGLIO
BY Thomas C. Bitts
THEIR ATTORNEY United States Patent Office 2,973,895
Patented Mar. 7, 1961

2,973,895
MOTOR MOUNTINGS

Raymond L. Brown, Banksville, N.Y., and Garret Mott, Jr., New Canaan, and Lawrence J. Smeriglio, Greenwich, Conn., assignors to Electrolux Corporation, Old Greenwich, Conn., a corporation of Delaware Filed June 3, 1959, Ser. No. 817,898

11 Claims. (Cl. 230—235)

Our invention relates to mounting means and more particularly to means for resiliently mounting the motor-fan unit within the housing of a vacuum cleaner and preferably also for providing an airtight seal between the unit and the housing.

The operation of the motor-fan unit necessarily produces vibrations in both peripheral and radial directions which, particularly if transmitted to the housing of the vacuum cleaner, results in the generation of undesirable noise, the housing acting as a sounding board for producing sound waves in the surrounding atmosphere. It is accordingly an object of our invention to provide mounting means capable of absorbing such vibrations while at the same time providing a support of adequate strength for the motor-fan unit. Also, it is necessary to have an airtight seal between the motor-fan unit and the casing of the vacuum cleaner in order to prevent recirculation of air and it is desirable that this seal should constitute a part of the mounting means.

Further objects and advantages of our invention will be apparent from the following description considered in connection with the accompanying drawings which form a part of this specification and of which;

Fig. 1 is a cross-sectional view of a vacuum cleaner embodying our invention;

Fig. 2 is a cross-sectional view on an enlarged scale of the motor-fan unit and the mounting means therefor and is taken on the line 2—2 of Fig. 3;

Figure 3:
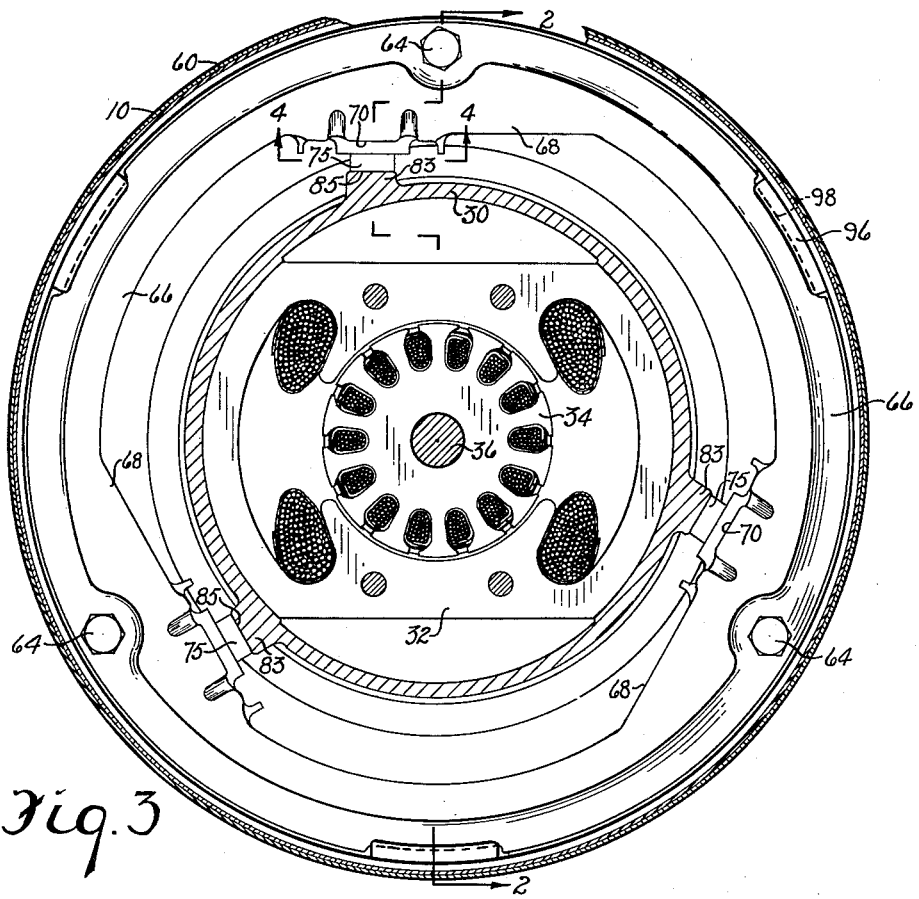
Fig. 3 is a cross-sectional view taken on the line 3—3 of Fig. 2.
Figure 5:
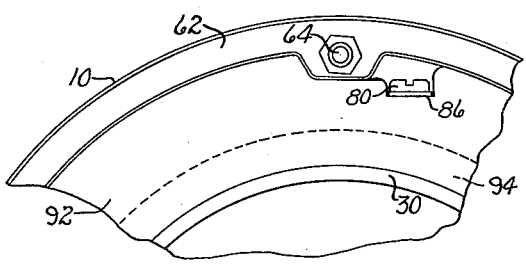
Fig. 5 is a cross-sectional view taken on the line 5—5 of Fig. 2.

Referring particularly to Fig. 1, reference character 10 indicates the housing of a vacuum cleaner which may be provided with wheels 12 for normally supporting it horizontally on a surface, such as the floor 14. The left-hand end of the housing 10, as viewed in Fig. 1, is provided with a removable closure member or cover 16 secured in place by a pivoted latch 18. Cover 16 is formed with a centrally located inlet opening to which may be connected a hose 20. Removably disposed within the left-hand end of casing 10 is a dust bag 22 having an inlet opening into which projects an inlet conduit 24 carried by the cover.

Reference character 26 designates generally a motor-fan unit which is mounted in the right-hand end of the housing 10, as viewed in Fig. 1, the housing 10, at least at this point, preferably being circular in cross-section. The right-hand end of the housing is provided with an outlet opening 28.

As seen more particularly in Figs. 2 and 3, the motor-fan unit 26 comprises an electric motor having a frame 30 within which is a stationary field 32 and an armature 34 on a shaft 36, the latter being rotatably mounted in bearings 38. Secured to the frame 30 of the motor is a two part fan housing 40 secured together and to the motor frame by tie bolts 41, and formed with an inlet opening 42 and an intermediate partition 44 having a passageway 46 therethrough. A first stage rotor 48 is fixed to the outer end of the shaft 36 adjacent to the inlet opening 42. Intermediate guide blading 50 is carried by the partition 44, while a second stage rotor 52 is disposed on the other side of partition 44.

The construction of the blower unit is such that rotation of the fans 48 and 52 causes air to be drawn in through the inlet 42 to the first stage rotor 48, from the periphery of which it passes through the guide blades 50 to the opening 46 in the partition 44, and thence through the second stage 52 to within the motor frame 30, as indicated by the arrows 53 in Fig. 2. From here the air passes over the armature and field, serving to cool them, and is then discharged through the openings 54 in the motor frame, as indicated by the arrows 55. Inasmuch as the operation of the blower produces a higher air pressure within the motor frame than exists at the inlet 42, there results a thrust on the shaft 36 acting in the direction of the arrow 56, which thrust is transmitted through the bearings 38 to the frame 30. If the cleaner is in its normal horizontal position, as shown in Fig. 1, this thrust acts in a substantially horizontal direction towards the inlet 42.

Figure 4:
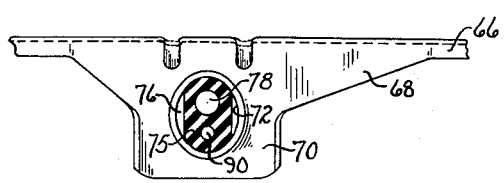
Fig. 4 is a cross-sectional view taken on the line 4—4 of Fig. 3.

Secured in airtight relation within the housing 10 is a bulkhead 60 having an inwardly extending flange 62. This flange is formed with three openings therethrough spaced 120° apart for receiving bolts 64. These bolts extend through correspondingly spaced openings in a metal ring 66, a ring 67 of rubber or other suitable resilient material being disposed between the metal ring 66 and the flange 62. Preferably formed integrally with the ring 66 are three bracket members 68, each having an axially extending portion 70, each portion being formed with an aperture 72 which is elongated in an axial direction, that is, parallel to the shaft 36 as is shown more particularly in Fig. 4. Formed integrally with resilient ring 67 are three resilient block 74 which are spaced 120° apart around the ring so as to seat on the radially outer surfaces of the axially extending portions 70 of brackets 68, as shown in Fig. 2. These blocks have radial projections 75 which extend inwardly through apertures 72. Projections 75 are also elongated in an axial direction so as to fit snugly within the apertures 72 in such axial direction, but are narrower than the apertures in a peripheral direction so as to leave spaces 76 between the sides of the projections and the sides of the apertures. Each block and projection is formed with an opening 78 extending therethrough in a radial direction. A stud 80 extends through each opening 78 and has threaded engagement with a tapped hole 82 in a boss 83 on the motor frame 30, the stud being formed with a shoulder 84 which seats against the outer surface 85 of the boss. A rectangular washer 86 is located between the head of each stud 80 and the outer surface of block 74, the stud 80 and washer 86 constituting a rigid structure which holds the inner end of the respective projection 75 against the flat surface 85 of boss 83 so as to radially space the motor frame and hence the motor-fan unit as a whole from the brackets. Each projection 75 is also formed with a space or void 90 which is located axially with respect to the opening 78 and in the direction from the opening in which the thrust acts, as indicated by the arrow 56.

Integral with the resilient ring 67 is a skirt portion 92 which has a bead 94 bearing against the motor frame 30 and in substantially airtight relation therewith. At points spaced 120° around the resilient ring 67, the latter is formed with lips 96 which engage over the recessed edges 98 of the rigid ring 66, as shown in Figs. 2 and 3.

During operation of the motor-fan unit air is caused to flow therethrough, with the result that the air leaving the unit through the openings 54 in the motor frame has a higher pressure than at the inlet 42, as previously described. However, recirculation of air from the openings 54 back to the inlet 42 is prevented by the fact that the resilient ring 67, including skirt 92 thereof, effects an airtight seal between the outer surface of the motor frame 30 and the inner surface of the housing 10. More specifically, the ring 67 is held in airtight relation against the flange 62 of the bulkhead 60 by virtue of being clamped against this flange by the rigid ring 66. The bead 94 is maintained in airtight relation with the frame 30 by being held against the latter by the higher air pressure existing within the skirt 92 than exists outside thereof.

When the vacuum cleaner is standing in the normal position on a floor, as illustrated in Fig. 1, one of the brackets 68 is at the top, as is shown in Fig. 3, and the weight of the motor-fan unit is transmitted to the rigid ring 66 through the rigid structure comprising the bolt 80 and washer 86 associated with this bracket and through the corresponding resilient block 74 to the upper or radially outer surface of the axially extending portion 70 of this bracket. Consequently, the material of this block 74 is in compression and the weight of the motor-fan unit does not produce any tension or sheer force in the resilient material of the mounting. During operation of the motor-fan unit thrust in the direction of the arrow 56 is produced and this is transferred from the motor frame to the ring 66 through the bolts 80 and that portion of the material of each of the projections 75 which is disposed between the respective bolts 84 and the ends of the openings 72. This places the material of the projections in this region in compression and consequently this force is transmitted therethrough without producing tension or sheer forces. The voids 90 are located in these portions of the projections 75 which are under compression and serve to make the blocks somewhat softer in this direction and thus better able to absorb vibration. It has been found that if these voids were not present, the compression of the rubber under high air pressure differences would be sufficient to make the blocks in effect so hard as to not properly absorb vibration.

Practically the only forces acting on the blocks 74 in a peripheral direction are those resulting from peripheral vibrations developed in the motor-fan unit. In other words, neither the weight of the unit nor forces resulting from thrust act in this peripheral direction. Hence, it is advantageous to have the blocks relatively soft in this direction, and this is accomplished by so proportioning their projections 75 with respect to the size of the openings 72 as to leave the spaces 76, as clearly shown in Fig. 4.

The presence of the resilient ring 67 between the flange 62 and the rigid ring 66 not only effects an airtight seal, but also materially reduces the transmission of vibrations to the flange and thus to the housing 10 of the vacuum cleaner.

While we have shown one more or less specific embodiment of our invention it is to be understood that this has been done for purposes of illustration only and the scope of our invention is not to be limited thereby, but is to be determined from the appended claims.

What we claim is:

1. In a vacuum cleaner, a housing having axial extent, a plurality of brackets mounted within said housing having axially extending portions formed with apertures extending radially therethrough, a plurality of resilient blocks seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, and rigid structure fixed to said motor-fan unit extending through said openings and bearing against the outer surfaces of said blocks.

2. In a vacuum cleaner, a housing having axial extent, a plurality of brackets spaced circumferentially within said housing having axially extending portions formed with apertures extending radially therethrough, a plurality of resilient blocks seating on the radially outer surfaces of said portions and having projections extending through said apertures, the dimension of each aperture in the circumferential direction being greater than the dimension in this direction of the projection extending therethrough, a motor-fan unit, the inner ends of said projections bearing against the outer surface of said motor-fan unit and spacing the latter from said brackets, said blocks and projections being formed with openings therethrough, and rigid structures fixed to said motor-fan unit and extending through said openings and bearing against the outer surfaces of said blocks.

3. In a vacuum cleaner, a housing having axial extent, a motor-fan unit which produces an axial thrust, a plurality of brackets within said housing having axially extending portions formed with apertures extending radially therethrough, a plurality of resilient blocks seating on the radially outer surfaces of said portions and having projections extending through said apertures, the inner ends of said projections bearing against the outer surface of said motor-fan unit and spacing the latter from said brackets, said blocks and projections being formed with openings therethrough, and rigid structure fixed to said motor-fan unit extending through said openings and bearing against the outer surfaces of said blocks, each projection being formed with a void spaced axially from the opening therethrough in the direction in which said thrust acts.

4. In a vacuum cleaner, a housing having axial extent, a motor-fan unit which produces an axial thrust, a plurality of brackets spaced circumferentially within said housing having axially extending portions formed with apertures extending radially therethrough, a plurality of resilient blocks seating on the radially outer surfaces of said portions and having projections extending through said apertures, the dimension of each aperture in the circumferential direction being greater than the dimension in this direction of the projection extending therethrough, the inner ends of said projections bearing against the outer surface of said motor-fan unit and spacing the latter from said brackets, said blocks and projections being formed with openings therethrough, and rigid structure fixed to said motor-fan unit extending through said openings and bearing against the outer surfaces of said blocks, each projection being formed with a void spaced axially from the opening therethrough in the direction in which said thrust acts.

5. In a vacuum cleaner, a housing having axial extent, a plurality of brackets within said housing having axially extending portions formed with apertures extending radially therethrough, means for mounting said brackets within said housing with resilient material disposed therebetween, a plurality of resilient blocks seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, and rigid structures fixed to said motor-fan unit extending through said openings and bearing against the outer surfaces of said blocks.

6. In a vacuum cleaner, a housing having axial extent, a plurality of brackets within said housing having axially extending portions formed with apertures extending radially therethrough, a ring of resilient material, means for mounting said brackets within said housing with said ring disposed therebetween, a plurality of resilient blocks integral with said ring seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, and rigid structure fixed to said motor-fan unit extending through said openings and bearing against the outer surfaces of said blocks.

7. In a vacuum cleaner, a housing having axial extent, a plurality of brackets mounted within said housing having axially extending portions formed with apertures extending radially therethrough, a ring of resilient material secured in airtight relation within said housing, a plurality of resilient blocks integral with said ring seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, rigid structure fixed to said motor-fan unit extending through said openings and bearing against the outer surfaces of said blocks, and a skirt integral with said ring and engaging said motor-fan unit in airtight relation.

8. In a vacuum cleaner, a housing having axial extent, a plurality of brackets within said housing having axially extending portions formed with apertures extending radially therethrough, a ring of resilient material secured in airtight relation within said housing, means for mounting said brackets within said housing with said ring disposed therebetween, a plurality of resilient blocks integral with said ring seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, rigid structure fixed to said motor-fan unit extending through said openings and bearing against the outer surfaces of said blocks, and a skirt integral with said ring and engaging said motor-fan unit in airtight relation.

9. In a vacuum cleaner, a housing having axial extent, a ring secured within said housing, a plurality of brackets integral with said ring having axially extending portions formed with apertures extending radially therethrough, a plurality of resilient blocks seating on the radially outer surfaces of said portions and having projections extending through said apertures, a motor-fan unit, the inner ends of said projections bearing against said motor-fan unit and spacing the latter from said brackets, said blocks and projections being formed with openings therethrough, and rigid structure fixed to said motor-fan unit extending through said openings and bearing against the outer surfaces of said blocks.

10. In a vacuum cleaner, a housing having axial extent, a ring of resilient material, a ring of rigid material secured within said housing with said ring of resilient materal therebetween, a plurality of brackets integral with said rigid ring having axially extending portions formed with apertures extending radially therethrough, a plurality of resilient blocks integral with said resilient ring seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, and rigid structure fixed to said motor-fan unit extending through said openings and bearing against the outer surfaces of said blocks.

11. In a vacuum cleaner, a housing having axial extent, a ring of resilient material secured in airtight relation within said housing, a ring of rigid material mounted within said housing with said ring of reslient material therebetween, a plurality of brackets integral with said rigid ring having axially extending portions formed with apertures extending radially therethrough, a plurality of resilient blocks integral with said resilient ring seating on the radially outer surfaces of said portions and having projections extending through said apertures, a motor-fan unit, the inner ends of said projections bearing against the outer surface of said motor-fan unit and spacing the latter from said brackets, said blocks and projections being formed with openings therethrough, rigid structure fixed to said motor-fan unit extending through said openings and bearing against the outer surfaces of said blocks, and a skirt integral with said ring and engaging said motor-fan unit in airtight relation.

References Cited in the file of this patent

UNITED STATES PATENTS

| | | |
|---|---|---|
| 2,670,896 | Ardito | Mar. 2, 1954 |
| 2,843,314 | Hansen | July 15, 1958 |
| 2,843,315 | Faith-Ell | July 15, 1958 |